Aug. 19, 1924.

E. VILLASENOR ET AL 1,505,827

TABLET MAKING MACHINE

Filed April 25, 1923    7 Sheets-Sheet 1

WITNESSES

William P. Goebel

A. L. Kitchin

INVENTOR

Eduardo Villasenor
Alberto Villasenor

BY

ATTORNEYS

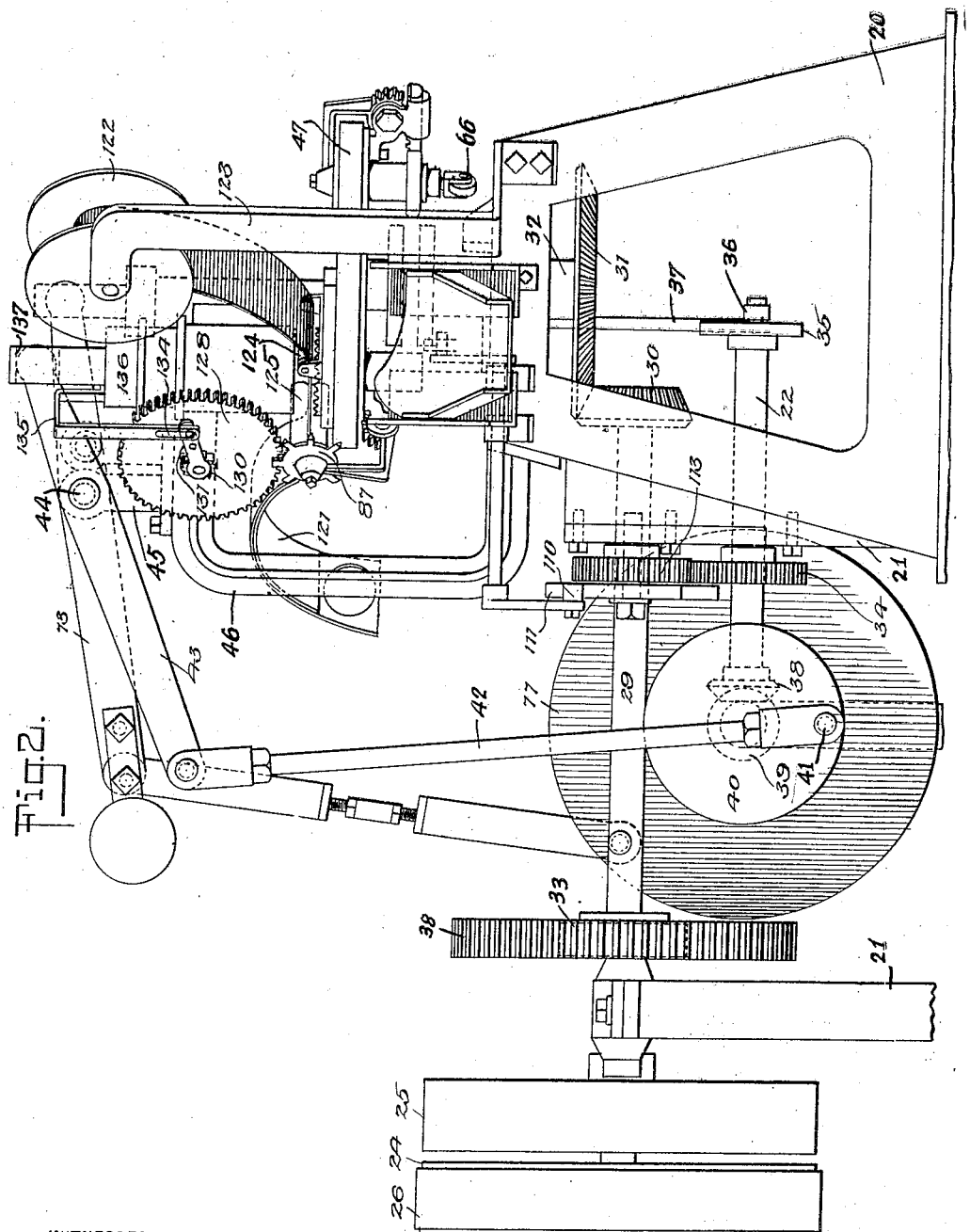

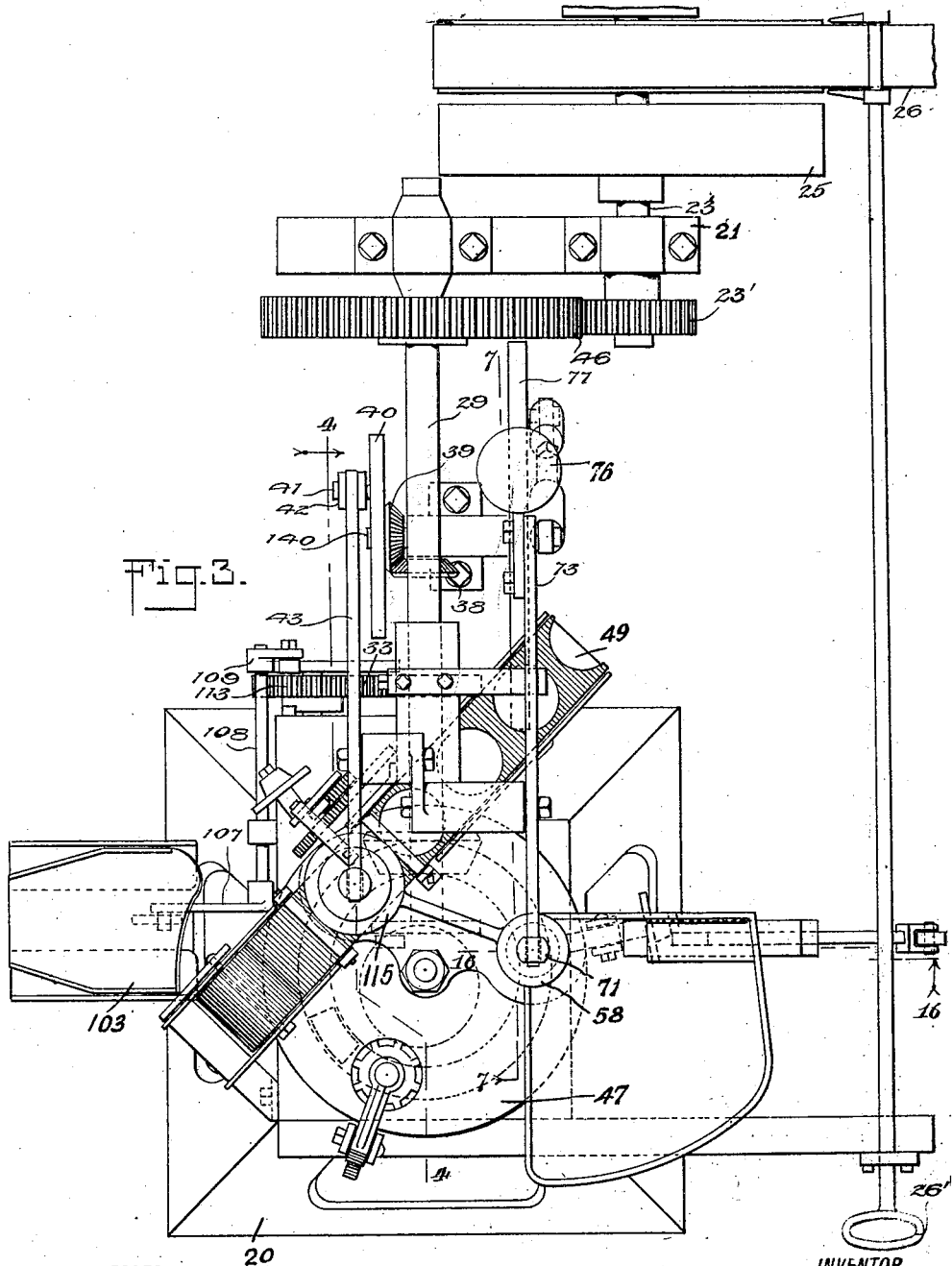

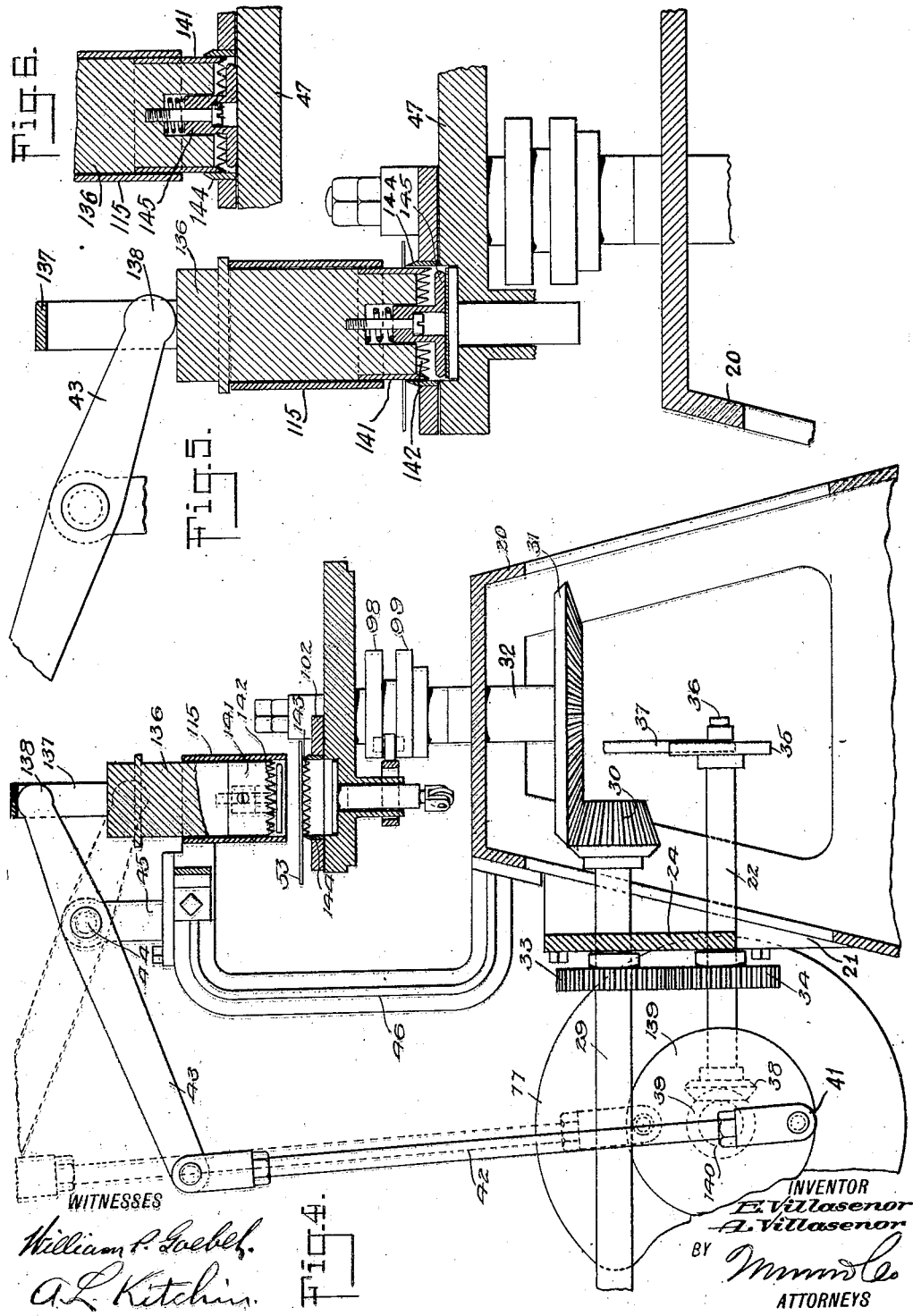

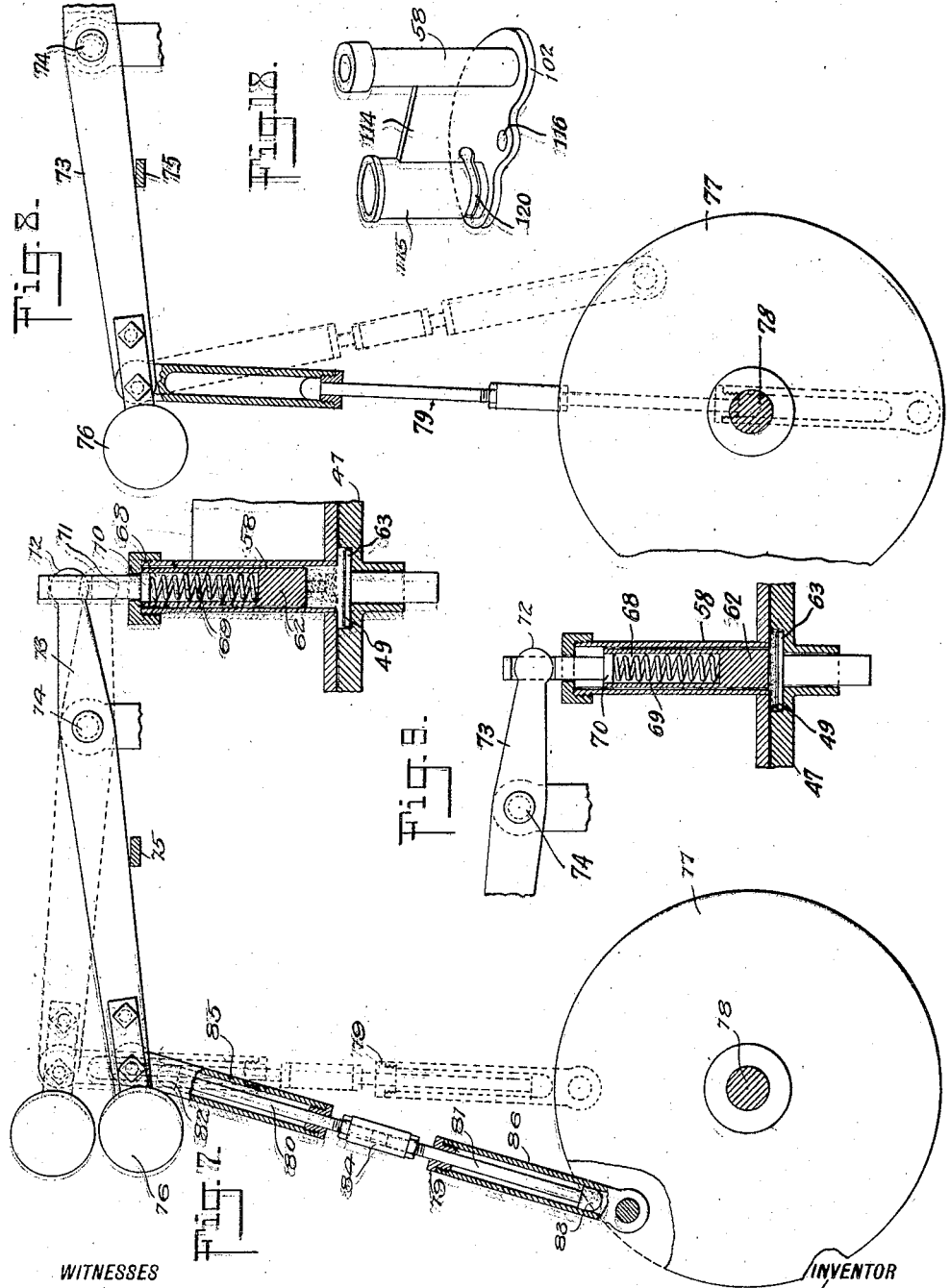

Aug. 19, 1924.
E. VILLASENOR ET AL
1,505,827
TABLET MAKING MACHINE
Filed April 25, 1923   7 Sheets-Sheet 6
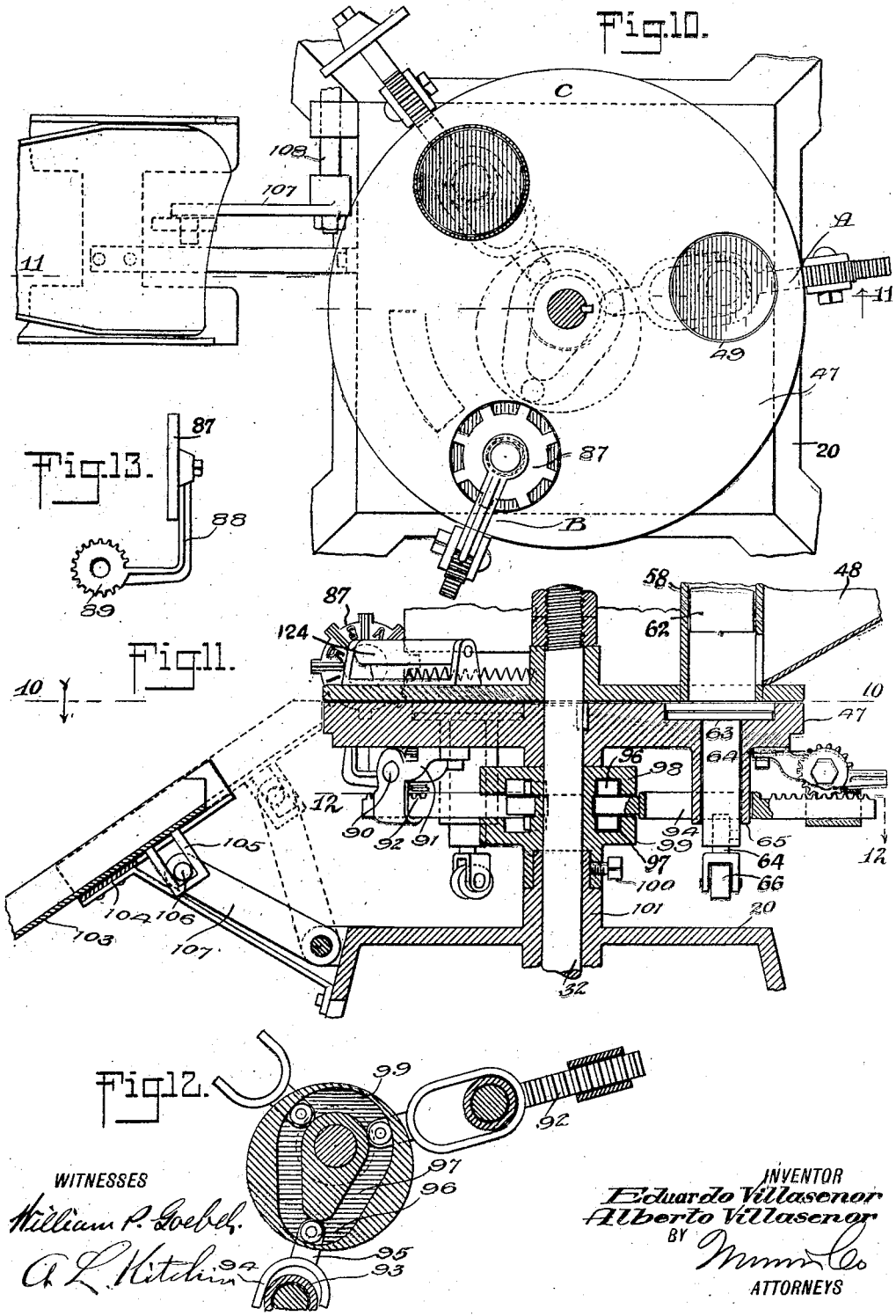

Aug. 19, 1924.
E. VILLASENOR ET AL
1,505,827
TABLET MAKING MACHINE
Filed April 25, 1923   7 Sheets-Sheet 7
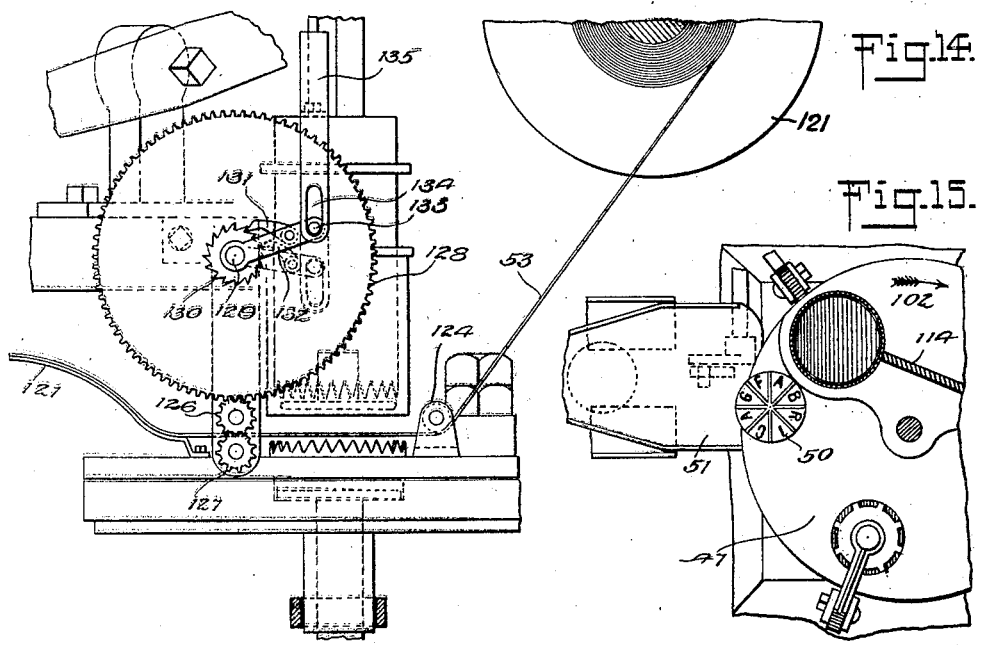
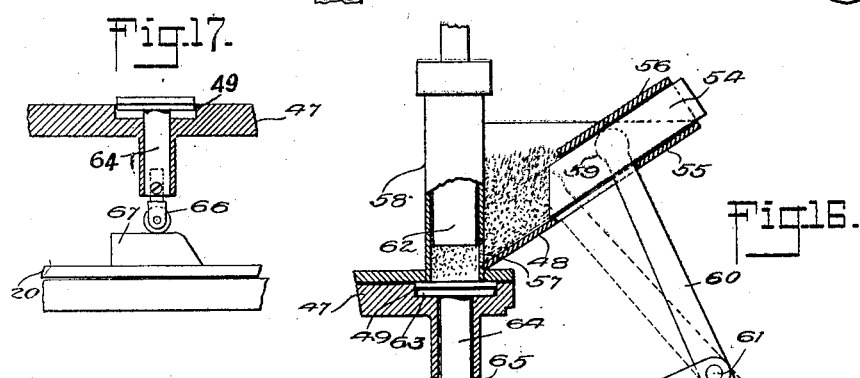
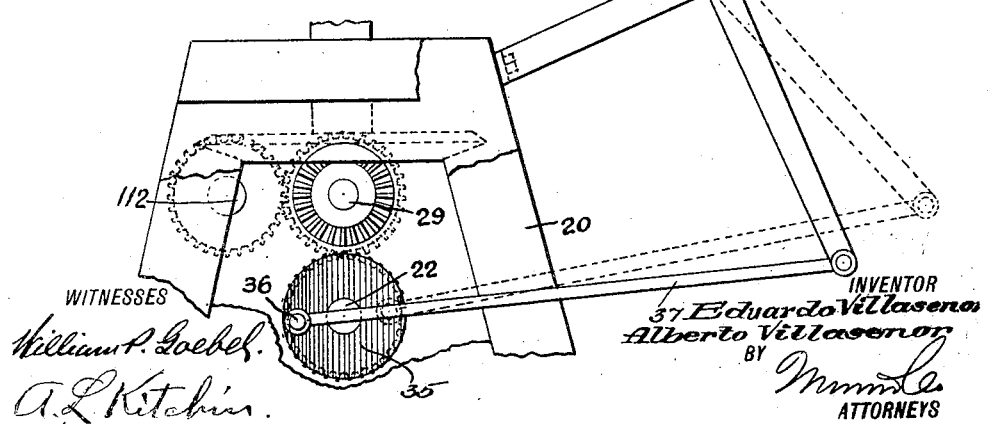

Patented Aug. 19, 1924.

1,505,827

UNITED STATES PATENT OFFICE.

EDUARDO VILLASENOR AND ALBERTO VILLASENOR, OF MERIDA, MEXICO.

TABLET-MAKING MACHINE.

Application filed April 25, 1923. Serial No. 634,528.

*To all whom it may concern:*

Be it known that we, EDUARDO VILLASENOR and ALBERTO VILLASENOR, both citizens of Mexico, and residents of Merida, Yucatan, Mexico, have invented a new and Improved Tablet-Making Machine, of which the following is a full, clear, and exact description.

This invention relates to machines for forming tablets of any desired material and has for an object to provide a construction which is automatic in operation and which is formed from a minimum number of parts.

Another object of the invention is to provide an extremely simplified structure which will form into independent tablets, any material from a pasty condition and discharge the finished tablet to one side intermittently.

An additional object of the invention is to provide a machine which will be automatic in its operation and which is designed to receive material in a paste form on one side and discharge the same in the form of tablets on the opposite side, each tablet being supported by a disk of paper or other material.

In the accompanying drawings—

Figure 2 is a side view of the machine shown in Figure 1.

Figure 3 is a top plan view of the machine shown in Figure 1.

Figure 4 is a fragmentary sectional view through Figure 3 approximately on line 4—4.

Figure 5 is a fragmentary view similar to the principal parts of Figure 4 but showing the parts in a different position.

Figure 6 is a fragmentary sectional view similar to Figure 5 but showing the cutter and associated parts as they appear when the turntable has moved a predetermined distance.

Figure 7 is a fragmentary sectional view through Figure 3 on line 7—7.

Figure 8 is a view similar to Figure 7 but showing the parts in their retracted position.

Figure 9 is a sectional view through a plunger and associated parts disclosing certain features of the invention, said view being similar to part of Figure 7 but with the plunger in a different position.

Figure 10 is a sectional view through Figure 11 approximately on line 10—10.

Figure 11 is a sectional view through Figure 10 approximately on line 11—11, said figure illustrating the turntable and certain other parts shown in Figure 1.

Figure 12 is a fragmentary sectional view through Figure 11 on line 12—12.

Figure 13 is a detail fragmentary side view of a printing or impression plate and operating arm therefor.

Figure 14 is a fragmentary side view of the upper part of the machine shown in Figure 1 illustrating how the ribbon of paper is fed through the machine and formed into disks.

Figure 15 is a fragmentary view somewhat similar to Figure 10 but on a reduced scale and showing the tablet about to be discharged into the discharge chute.

Figure 16 is a fragmentary sectional view similar to part of Figure 11 but showing the material being forced into the forming tube.

Figure 17 is a fragmentary view partially in section illustrating the ejecting means used for ejecting the tablet after it has been formed and printed.

Figure 18 is a perspective view of a plate, a pair of guiding sleeves and associated parts embodying certain features of the invention.

Figure 1:
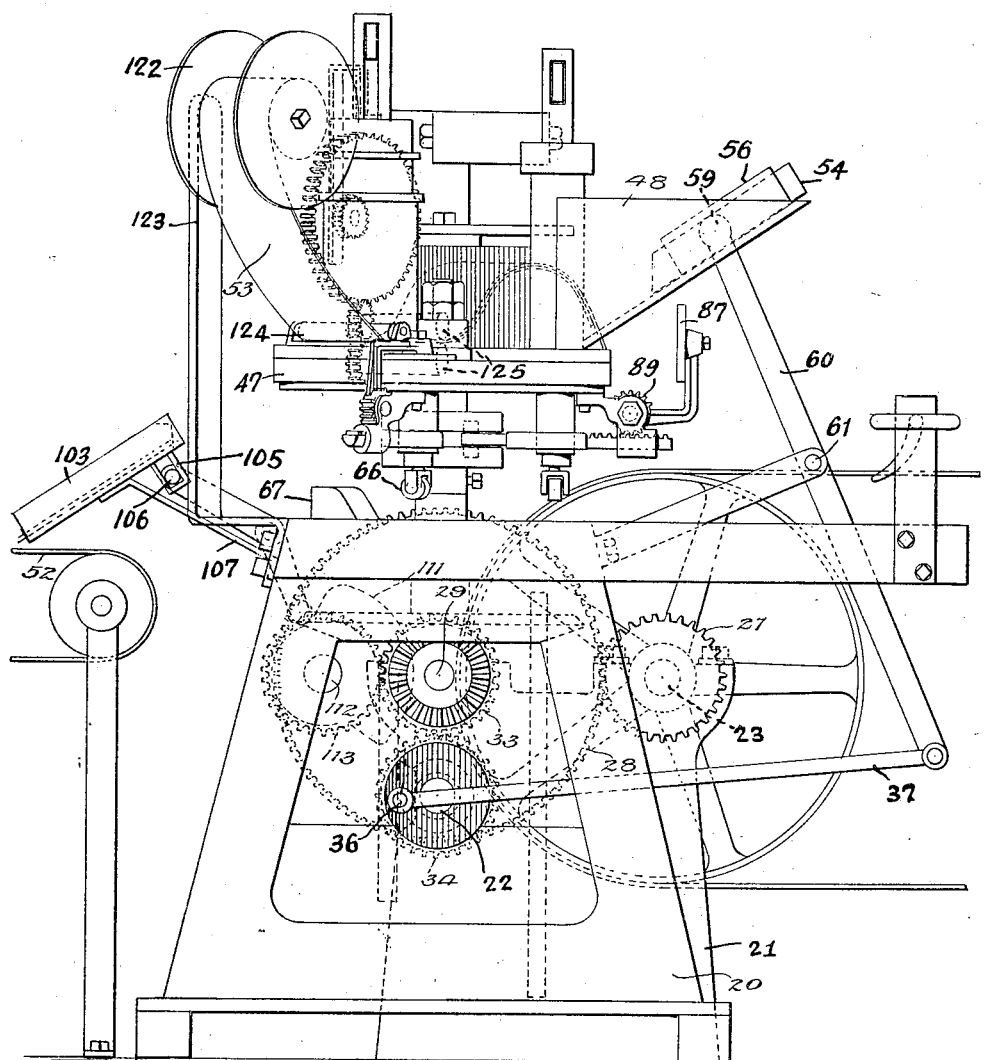
Figure 1 is a front view of the machine disclosing an embodiment of the invention.

Referring to the accompanying drawings by numeral, 20 indicates a supporting frame which may be of any desired construction and preferably formed of metal and hollow as indicated in Figure 4. This frame is provided with a suitable bracket 21 supporting shafts 22 and 23, shaft 23 being the power driving shaft and carrying at one end an idler pulley 24 and a fixed pulley 25, said fixed pulley receiving power from any suitable source through the belt 26. A pinion 27 is secured to shaft 23, said pinion meshing with a large gear wheel 28 rigidly secured to the shaft 29 which shaft at its inner end carries the bevel pinion 30 meshing with the bevel gear 31 secured to the vertical shaft 32. The shaft 29 carries a small gear 33 continually meshing with the gear 34 which latter gear is rigidly secured to the shaft 22. The shaft 22 at one end has a disk 35 secured thereto carrying a wrist pin 36 which wrist pin accommodates the end of the link 37 which end is provided with a suitable bearing surrounding the wrist pin in order that upon the rotation of the disk 35 the link 37 will be reciprocated. At the end of the shaft 22 opposite that carrying the disk 35 there is mounted a bevel gear 38, said bevel gear meshing with the bevel gear 39 rigidly secured to the disk 40 which disk is provided with a wrist pin 41 for accommodating the apertured end of the link 42, which link in turn is pivotally connected with a lever 43 pivotally mounted at 44 on a suitable auxiliary bracket 45 rigidly secured to the bracket 46, which latter bracket is rigidly secured to the supporting frame 20. When the power is turned on, the driving shaft 29 will be rotated and power will be taken off of this shaft for operating all of the parts of the machine which are properly timed to secure the desired function.

In the particular structure shown in the accompanying drawings, the various parts are caused to operate three times to one revolution of the turntable 47 so that the various parts will perform their functions rapidly. In operation, any desired material, preferably in the form of paste, is placed in the hopper or magazine 48 and is forced into the cavities or molds 49 as they pass the hopper. At a desired point an impression is made thereon, as for instance, a desired configuration with letters as indicated in Figure 15. After this impression has been made, the finished tablet 50 is ejected from the mold 49 and gradually forced into the discharge chute 51 which directs the same under the action of gravity to any desired point, as for instance, on the traveling belt 52. At a certain point, a disk of paper is punched out of the paper ribbon 53, said disk being deposited in the respective molds or cavities 49 before they move opposite the hopper whereby the pressed or formed tablet is resting on this disk and, consequently, will not adhere to the ejecting mechanism when the same is operating as indicated in Figure 17.

The hopper or magazine 48 may be of any desired size and is adapted to receive any material to be molded, said material preferably being formed as a paste. Among the articles to be molded are tablets of chocolate, candy of different kinds and bread and pastry of different kinds. When the desired material has been placed in the hopper and in substantially the required pasty condition, the machine may be started and as soon as it begins to operate the feeding plunger is reciprocated, said plunger being guided by the bottom 55 of the magazine 48 and by an enclosing housing 56. This plunger moves toward and from the inlet opening 57 formed in the tube 58. Preferably, one motion of the feeding plunger 54 forces sufficient material from the hopper through opening 57 to form one tablet or bar. The plunger 54 is provided with a suitable socket adapted to receive the enlarged rounded end 59 of lever 60. This lever is pivotally mounted at 61 and is pivotally connected with the link 37 so that as said link reciprocates the lever will be rocked for reciprocating the plunger 54. After the desired quantity of material is forced through the opening 57, a compressing plunger 62 moves downwardly onto the material forced into the tube 58 and forces all or most of said material into the mold or cavity 49. Preferably, there is only sufficient material to completely fill this cavity or mold. It will be understood that a strip of paper has been placed in this mold before it reaches the position shown in Figure 16 whereby when the tablet is pressed into the mold it will rest on the paper disk. A metal disk 63 is arranged normally at the bottom of the mold 49 and is rigidly secured to a rod 64 slidingly positioned in the tubular extension 65 of the turntable 47. A roller 66 is pivotally mounted in the lower end of the shaft 64 and acts in conjunction with the cam 67 positioned on part of the frame 20 to raise the rod 64 and disk 63 so that these members will act as an ejecting mechanism. Preferably, the parts are raised until the upper surface of the disk 63 is flush with the upper surface of the turntable 47. The compressing plunger 62 is provided with a comparatively deep bore 68 in which is arranged a compression spring 69 acted on by the enlarged end 70 of the rod 71, which rod is provided with a slot in its upper end for accommodating the enlarged rounded end 72 of the lever 73. This lever is pivotally mounted at 74 on a suitable bracket and is limited in its swinging movement by a stop 75. A counterbalancing weight 76 is arranged on the end opposite the enlargement or head 72 and acts to swing the lever 73 downwardly to a position against the stop 75 whenever permitted to do so. This lever is operated by the disk 77 secured to the shaft 78, which shaft also carries the bevel gear 39. A suitable connecting mechanism 79 is pivotally connected with the disk 77 and also pivotally connected with lever 73 near weight 76 for raising the lever once on each revolution of the disk 77.

In order that this raising movement and consequent depression of the compression plunger 62 may be comparatively quick, the mechanism 79 acts on the lever 73 for only a quarter of a revolution of the disk 77. In order to pivotally connect the structure 79 with the disk 77 and yet allow this action, there is a certain loose motion provided which is taken care of by the respective piston rods 80 and 81 having enlarged ends or pistons 82 and 83, said piston rods being connected by a suitable connecting sleeve 84 which permits of adjustment as desired. These pistons and piston rods operate in tubular members 85 and 86 respectively, the member 85 being pivotally connected with the lever 73 and member 86 being pivotally connected with the disk 77.

In Figure 7, the disk 77 is at the point of starting to raise the lever 73 and will continue to raise the same until the structure 79 assumes the dotted position shown in this figure. As the structure moves for one-eighth of a turn further on, the lever 73 moves downwardly again and rests on the stop 75. The continued downward movement of member 86 and associated parts as indicated in Figure 8 will not effect the position of lever 73 and said lever will remain resting against the stop 75 until the structure 79 again assumes the position shown in Figure 7. This structure causes the compressing plunger 62 to have a comparatively quick movement for forcing the material discharged into the tube 58 into the mold or cavity 49. As the turntable 47 is continually rotating this is very desirable. The plunger 62 never passes below the bottom of the tube 58 so that there is no danger of it striking against the turntable 47. In case there should be too much material in the tube 58, spring 69 will be compressed and thereby take care of this condition.

It will be understood that a paper disk is fed into the cavity or mold 49 at one point so that the molded tablet is resting on this paper when it leaves the vicinity of the hopper. After the table 47 has rotated for one-third of a revolution from the position indicated in Figure 9, the formed tablet will be engaged and pressed quickly by a printing or impression pad 87 while substantially at the same time a new batch of material is forced into the next succeeding mold. The pad 87 may be of any desired size and shape and may be caused to produce any desired impression on the tablet, said impression being shown in Figure 15 as radiating ridges of letters between the respective ridges. The impression pad 87 is rigidly secured to a bracket 88 (Figure 13) which bracket is formed integral with or rigidly secured to a segmental gear 89 which gear is mounted on a shaft or pin 90 carried by the bracket 91, which bracket is secured to the rotating platform 47. The gear 89 is continually in mesh with a rack 92 which rack at its inner end is connected to or formed integral with a loop member 94 which loop member has a projection 95 extending therefrom and carrying a pair of rollers 96 fitting into the cam waves 97 of the respective cams 98 and 99. These cams are rigidly secured to the stationary frame 20 through the use of a set screw 100 engaging the projection 101 formed on the frame 20 (Figure 11).

In reference to Figure 10 it will be understood that the position indicated as A is the loading position, position B the printing position and the position C the disk receiving station. The cams 98 and 99 are so positioned that the various loop members 94 will be moved to their outer position when they are at the printing station so that the printing pads 87 will be moved over quickly to a printing position as the respective pads and associated parts reach the printing station B and then move quickly back so as to be out of the way of certain other operations.

It will be noted from Figure 11 that the depending sleeves 65 project through the loop members 94 and act as a guide therefor while permitting the ejecting mechanism to properly function, which ejecting mechanism consists of the roller 66, cam 67 and shaft 64 secured to the disk 63. As the respective racks 92 move outwardly when they reach the station B, gear 89 will be quickly rotated for causing the printing pad 87 to quickly strike the tablet and quickly move therefrom so that the slow motion of the table 47 will not prevent a good impression. Immediately upon the pad 87 leaving the tablet, the ejecting mechanism begins to operate to force the tablet to a position above the table 47. As the table, tablet and associated parts continue to rotate, the raised tablet will be caused to strike the stationary plate 102 as indicated in Figure 15 and be forced off of the table 47 thereby. As the tablet drops off of the table it is caught by the discharge chute 103 and directed to a suitable discharge point, as for instance, the belt 52. As the racks 92 and associated parts rotate with the table 47, the chute 103 cannot remain against or near the table 47.

In order to provide a proper movement of the discharge chute toward and from the table in order to properly guide the tablets to a suitable discharge point, the chute 103 is slidingly mounted in a support 104 and is provided with a depending guide 105 engaged by pin 106, which pin is secured to a crank arm 107. A shaft 108 journaled in suitable bearings carried by the frame 20, is rigidly secured to one end of the crank arm 107 and is also rigidly secured to an arm 109 which latter arm carries a roller 110 on its outer end bearing against the cam 111, which cam is rigidly secured to the shaft 112 (Figures 1 and 2). This shaft is journaled in suitable bearing and carries a gear wheel 113 meshing continually with the gear wheel 33. It will, therefore, be seen that the chute 103 is reciprocated continually and has one complete back and forth cycle for each one-third rotation of the turntable 47 so that it can receive each tablet as it is discharged.

In respect to the mechanism for providing paper disks for the respective molds at station C, suitable means have been shown particularly in Figures 1, 2, 3 and 14. As indicated in Figure 18 the tubular plunger guide 58 is preferably made integral with a bracing plate 114 and said bracing plate is made integral with a tubular cutting guide 115. Also, the plate 114 and tube 58 are made integral with the plate 102 which plate has an aperture in the extension 116 through which the end of the shaft 32 projects so that this plate may be clamped properly in position without interfering with the rotation of the table 47. The shaft 32 is rigidly secured to a large bevel gear 31 meshing with the pinion 30 which pinion is rigidly secured to the driving shaft 29.

As indicated more particularly in Figure 18, the guiding tube 115 is cut away at 120 and also part of the plate 114 whereby the ribbon of paper 53 may freely pass beneath the cutter and out over the arc-shaped guide 121. This guide is necessary in order to prevent the paper from striking any of the impression pads 87 and associated parts. It will be noted that a suitable reel 122 is mounted on a suitable bracket 123, said reel carrying a roll of paper forming the ribbon 57, which ribbon is guided by a suitable roller 124 and extends through the opening 120 and is engaged by the feeding rollers 125 so as to be moved as desired. These two rollers may be formed of rubber or any desired material and are rigidly secured to the respective pinions 126 and 127, said pinions meshing and one of said pinions, namely, pinion 126 meshing with the large gear 128. The gear 128 is loosely mounted on a shaft 129 and has a ratchet wheel 130 rigidly secured thereto. A pawl 131 is carried by a link 132 pivotally mounted at one end on shaft 129 and at the opposite end is provided with a pin 133 projecting through the slot 134 of the reciprocating U-shaped member 135. Whenever this member moves downwardly, the pawl 131 slips over the ratchet wheel 130 but when it moves upwardly the pawl will engage the ratchet wheel and rotate said ratchet wheel and gear wheel 128 a certain distance after the loose motion caused by slot 134 has been taken up.

The U-shaped member 135 has one end rigidly secured to the cutting plunger 136. This plunger reciprocates vertically in the tubular cutting guide 115, said cutting plunger being provided with an inverted U-shaped member 137 at its upper end for accommodating the enlarged end 138 and lever 43. This U-shaped member 137 allows for loose or idle motion of the lever so that it is actuating the plunger for only part of the time. It will be noted that this lever is actuated by the link 42 which is pivotally connected to the disk 139 rigidly secured to the shaft 140, which shaft carries the bevel pinion 39 meshing with bevel pinion 38. The disk 77 is also secured to the shaft 140, said disk 77 actuating lever 73 and associated parts. It will be understood, of course, that these parts are so timed as to cause the cutting plunger 136 to operate at the desired time. This cutting plunger is provided with a cutting sleeve 141, which sleeve is preferably formed with a saw edge 142 which acts as the cutting members, said saw edge co-operating with the saw edges 143 of a stationary or fixed cutter 144. The fixed cutter is rigidly secured in plate 102.

After the ribbon of paper 53 has been properly positioned as shown in Figure 14, the cutter will move downwardly at the proper time and by reason of the saw teeth form of the cutters, the disks will readily be cut out of the ribbon of paper as the parts move to the position shown in Figure 5. In addition to cutting the disks from the ribbon of paper, a spring pressed ejecting plunger 145 will eject or force the cut disks into the mold or cavity 49 at station C. It will be noted that this ejecting plunger is normally below the saw edge 142 and, therefore, readily forces the disk of paper into the mold.

As indicated in Figure 3, the disk cutting mechanism merely punches disks of paper out of the ribbon 53 whereby the rollers 125 may readily pull the paper from time to time to eject the cut portion of the ribbon and to move uncut portions beneath the cutter. As the U-shaped member 135 is secured to the cutting plunger 136, it will be evident that as the plunger moves down to perform the cutting operation, gear wheel 128 will not be operated as the pawl 131 will merely slip over the ratchet wheel 130. On its return movement there will be an idler or loose motion by reason of the slot 134 so that the cutters will become fully disengaged before the pawl 131 will begin to function and, consequently, before the ribbon 53 will begin to move.

In operation when the belt 26 is shifted by the lever 26', power will be supplied to the fixed pulley 25 and, consequently, the shaft 23 will begin to rotate. The pinion 23' is rigidly secured to shaft 23 and is rotated thereby, said pinion continually meshing with the driving gear 146 which driving gear is rigidly secured to the shaft 29. This shaft is supported by suitable bearings and carries the pinion 30 which meshes with the bevel gear 31 so that as the shaft 29 rotates, gear 31 and the shaft 32 will be rotated. This shaft is keyed to the turntable 47 and, consequently, will rotate the turntable. At the same time that power is transmitted to the turntable in this manner, power is transmitted from shaft 29 through the bevel gear 33 to the gear 34 and also to the gear 113 which latter gear operates the cam 111 while gear 34 is rigidly secured to the shaft 22 and rotating said shaft. This shaft carries at one end the disk 35 and acts to operate the link 37 while at the opposite end the shaft 22 carries the bevel gear 38 meshing with the gear 39 for rotating shaft 140 and, consequently, for rotating the disks 40 and 77. From these two disks power is taken off for operating the respective levers 43 and 73 which actuate the cutting plunger 136 and the compression plunger 62 respectively.

What we claim is:—

1. In a tablet forming machine of the character described, a turntable having a plurality of depressions acting as molds, means for feeding paper disks into said molds as they pass a certain point, means for feeding material to be formed into tablets as the molds pass a second point, means slightly entering said molds as they pass a third point for forming a design thereon, a plunger for compressing the material entering the molds, said plunger acting immediately after the material has entered the molds, and means for ejecting the finished tablet after it has received said impression.

2. A tablet forming machine, comprising a rotating turntable formed with a plurality of equally spaced depressions forming molds, means for rotating said turntable, means at one point for cutting a paper disk from a ribbon of paper and depositing the same in said molds, a feeding mechanism at a second point for feeding material into the molds on top of said paper disk, a plunger for compressing the material on top of said paper disk, means at a third point for producing a design on the pressed material, means for automatically ejecting said pressed material after it leaves the means for producing the design thereon, means acting in connection with the turntable for forcing the completed tablet from the turntable, and a reciprocating chute for receiving the discharged tablet and directing the same to a suitable discharge point.

3. In a machine of the character described, a rotating platform provided with a plurality of spaced depressions acting as molds, means for rotating said platform and means for supplying said molds one at a time with paper disks, said means comprising a stationary cutting member, a reciprocating cutting member, an ejector carried by the reciprocating cutting member, means for feeding a strip of paper across the stationary cutting member, and means for operating the reciprocating cutting member.

4. In a machine of the character described, a rotating platform, means for rotating said platform, said platform being formed with a plurality of depressions acting as molds, means for feeding material to be molded into said molds, a plunger for compressing said material in said molds, a lever for actuating said plunger, a driving disk and means for connecting said driving disk with said lever, said means comprising a pivotally mounted cylinder connected with said lever, a pivotally mounted cylinder connected with said disk, a piston and connecting rod for each of said cylinders, and means for securing said connecting rods together.

5. In a machine of the character described, a rotating platform provided with a plurality of depressions acting as molds, means for supplying said depressions with a material to be molded, means for compressing said material in the molds and means for imprinting an ornamentation on one face of the compressed material, said last mentioned means comprising a printing pad, an arm carrying said printing pad, a gear rigidly secured to said arm, a rack continually meshing with said gear, and a cam for actuating said rack.

6. In a machine of the character described, a rotatable turntable provided with a plurality of equally spaced depressions acting as molds, means for feeding material into said depressions as they pass a given point, means for compressing said material immediately after it enters the molds and means for imprinting a design on the compressed material as it reaches a second point, said means including a printing member, means carried by the turntable for swinging said printing member into and out of printing position, and a stationary cam for actuating said means as said means moves with the turntable.

EDUARDO VILLASENOR.
ALBERTO VILLASENOR.